(12) United States Patent
Choi

(10) Patent No.: US 9,826,278 B2
(45) Date of Patent: Nov. 21, 2017

(54) ELECTRONIC DEVICE AND METHOD FOR PROVIDING BROADCAST PROGRAM

(71) Applicant: SAMSUNG ELECTRONICS CO., LTD., Suwon-si, Gyeonggi-do (KR)

(72) Inventor: Hye-jin Choi, Suwon-si (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 15/142,150

(22) Filed: Apr. 29, 2016

(65) Prior Publication Data

US 2017/0026706 A1 Jan. 26, 2017

(30) Foreign Application Priority Data

Jul. 21, 2015 (KR) .................. 10-2015-0103015

(51) Int. Cl.
| | |
|---|---|
| *H04N 21/462* | (2011.01) |
| *H04N 21/482* | (2011.01) |
| *H04N 21/472* | (2011.01) |
| *H04N 21/431* | (2011.01) |
| *H04N 21/84* | (2011.01) |
| *H04N 5/445* | (2011.01) |

(52) U.S. Cl.
CPC ..... *H04N 21/4828* (2013.01); *H04N 21/4312* (2013.01); *H04N 21/47214* (2013.01); *H04N 21/84* (2013.01); *H04N 2005/44547* (2013.01)

(58) Field of Classification Search
CPC .................................... H04N 21/4622
USPC ....................................... 725/53
See application file for complete search history.

(56) References Cited

U.S. PATENT DOCUMENTS

| | | | |
|---|---|---|---|
| 6,061,056 A * | 5/2000 | Menard | H04N 5/4401 348/E5.108 |
| 6,400,652 B1 | 6/2002 | Goldberg et al. | |
| 2001/0031129 A1 | 10/2001 | Tajima | |
| 2011/0116690 A1 | 5/2011 | Ross et al. | |
| 2011/0135283 A1 | 6/2011 | Poniatowki et al. | |
| 2014/0282674 A1* | 9/2014 | Conradt | G06K 9/00711 725/19 |

FOREIGN PATENT DOCUMENTS

JP H11-046343 2/1999

OTHER PUBLICATIONS

Extended EP search report dated Nov. 25, 2016 for corresponding EP Application No. 16170456.4.

* cited by examiner

*Primary Examiner* — Hunter B Lonsberry

(74) *Attorney, Agent, or Firm* — Nixon & Vanderhye, P.C.

(57) ABSTRACT

An electronic device and method for providing a broadcast program are provided. The electronic device includes: a tuner configured to receive a broadcast signal; a storage configured to store an image of a particular person; and a controller configured to acquire a broadcast image including a person from a broadcast signal of a preset broadcast program received through the tuner and, if it is determined that the person included in the broadcast image is the same as the particular person in the stored image, provide a user with the broadcast program based on a point in time when the particular person is included in the broadcast image.

12 Claims, 12 Drawing Sheets

ELECTRONIC DEVICE AND METHOD FOR PROVIDING BROADCAST PROGRAM

CROSS-REFERENCE TO RELATED APPLICATION

This application is based on and claims priority under 35 U.S.C. §119 to Korean Patent Application No. 10-2015-0103015, filed on Jul. 21, 2015, in the Korean Intellectual Property Office, the disclosure of which is incorporated by reference herein in its entirety.

BACKGROUND

1. Field

The present disclosure relates to an electronic device and method for providing a broadcast program, and for example, to an electronic device and method for providing a user with a broadcast program including a particular person.

2. Description of Related Art

A display apparatus is an apparatus that has a function of displaying an image that a user may view. The user may view a broadcast through the display apparatus. The display apparatus displays a broadcast, which is selected by the user from a broadcast signal transmitted from a broadcasting station, on a display. There is a current global trend toward a change of broadcasts from analog broadcasting to digital broadcasting.

Digital broadcasting refers to transmitting a digital image and a voice signal as a broadcast. In comparison with analog broadcasting, digital broadcasting is robust with respect to external noise, thus reducing data loss, is appropriate for error correction, provides a high resolution, and provides a clear screen. Digital broadcasting may also enable a bidirectional service unlike in the case of analog broadcasting.

Also, in addition to a digital broadcast function, a smart TV is recently provided to provide various types of contents. There is a need for researches to provide a user with a broadcast content and more various viewing environments.

SUMMARY

An electronic device and method for providing a user with a broadcast program including a particular person are provided.

Additional aspects will be set forth in part in the description which follows and, in part, will be apparent from the description.

According to an aspect of an example embodiment, an electronic device includes: a tuner configured to receive a broadcast signal; a storage configured to store an image of a particular person; and a controller configured to acquire a broadcast image including a person from a broadcast signal of a preset broadcast program received through the tuner and, if it is determined that the person included in the broadcast image is the same as the particular person in the stored image, to provide a user with the broadcast program based on a point in time when the particular person is included in the broadcast image.

The electronic device may further include a communicator comprising communication circuitry. The controller may be further configured to receive a search word for searching for the image of the particular person, to transmit the received search word to an external server through the communicator, to receive a search result image based on the search word from the external server, and to store the search result image in the storage.

If the person included in the broadcast image is similar to the particular person in the stored image by a preset threshold value or more through a person recognition algorithm, the controller may be further configured to determine that the person included in the broadcast image is the same as the particular person in the stored image.

The controller may be further configured to set information about the broadcast program through a user input.

The controller may be further configured to record the broadcast image from the point in time when the particular person is comprised in the broadcast image.

The electronic device may further a display. The controller may be further configured to display a thumbnail image of the broadcast image including the particular person.

The electronic device may further include a display. The controller may be further configured to provide the display with an interface for receiving a user input indicating whether to view the broadcast program.

If a user input to select viewing of the broadcast program is received, the controller may be further configured to provide the display with a broadcast image of the broadcast program.

The electronic device may further include a display. If it is determined that the person included in the broadcast image is the same as the particular person in the stored image, the controller may be further configured to automatically provide the display with the broadcast image of the broadcast program According to an aspect of another embodiment, a method of providing a broadcast program, includes: acquiring a broadcast image including a person from a broadcast signal of a preset broadcast program received through a tuner; determining whether the person included in the broadcast image is the same as a particular person in a pre-stored image; and providing a user with the broadcast program based on a point in time when the particular person is included in the broadcast image.

The method may further include: receiving a search word for searching for the image of the particular person; transmitting the received search word to an external server through a communicator comprising communication circuitry; receiving a search result image based on the search word from the external server through the communicator; and storing the search result image.

If it is determined that the person included in the broadcast image is similar to the particular person in the pre-stored image by a preset threshold value or more through a person recognition algorithm, the person included in the broadcast image may be determined as being the same as the particular person in the pre-stored image.

The method may further include setting information about the broadcast program through a user input.

The providing of the broadcast program to a user may include recording the broadcast image from the point in time when the particular person is included in the broadcast image.

The providing of the broadcast program to the user may include displaying a thumbnail image of the broadcast image including the particular person on a display.

The providing of the broadcast program to the user may include providing a display with an interface for receiving a user input indicating whether to view the broadcast program.

The providing of the broadcast program to the user may include: if a user input to select viewing of the broadcast program is received, providing the display with a broadcast image of the broadcast program.

The providing of the broadcast program to the user may include: if it is determined that the person included in the broadcast image is the same as the particular person in the pre-stored image, automatically providing a display with a broadcast image of the broadcast program.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
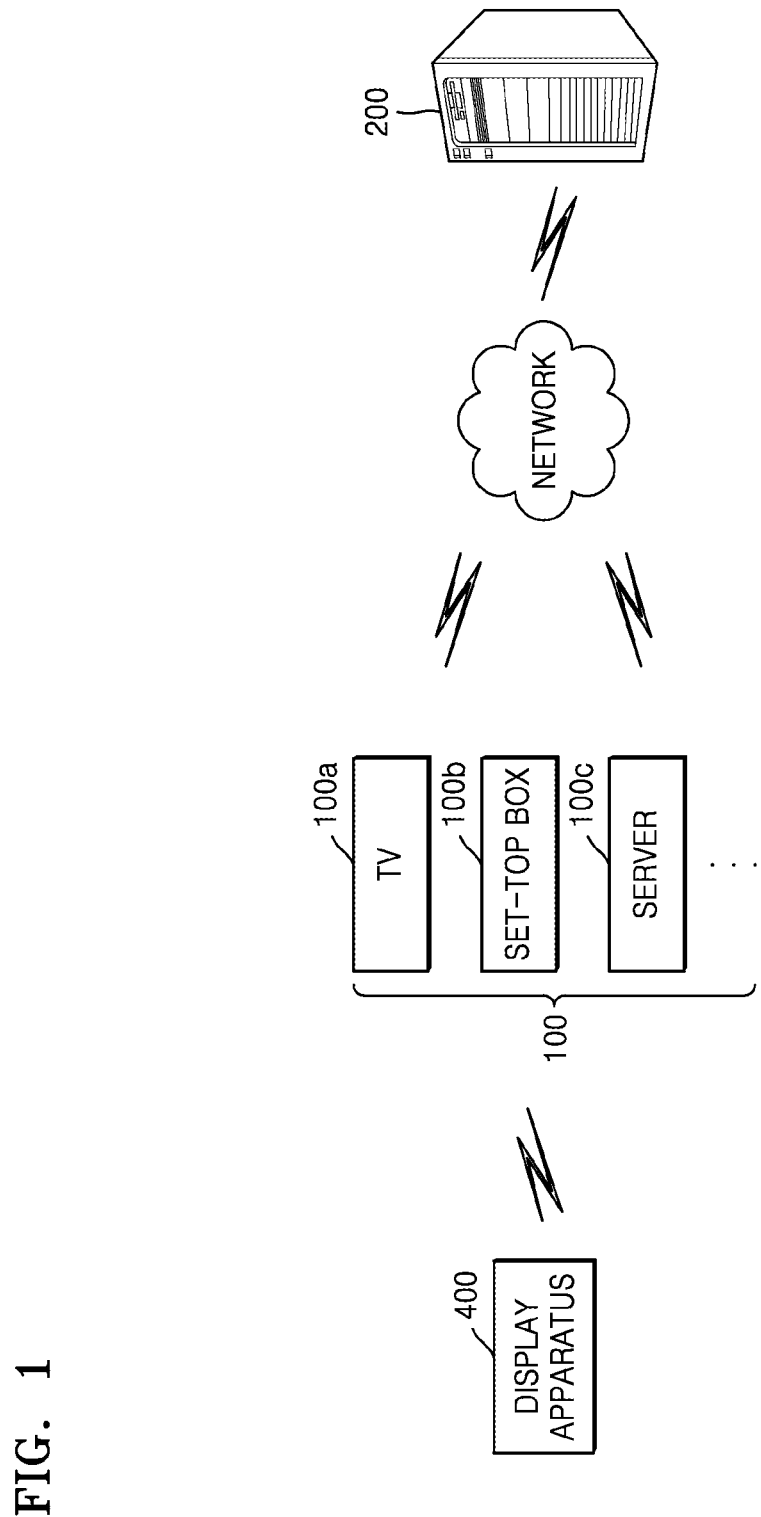
FIG. 1 illustrates a system for providing a broadcast program including a particular person, according to an embodiment.

Reference will now be made in detail to various embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

A goal, characteristics, and merits of embodiments will be more apparent through the detailed description of the specification associated with the attached drawings. However, various modifications may be made, and several embodiments may be embodied. Therefore, particular embodiments will be illustrated in the drawings and will be described in detail with reference to the drawings. Like reference numerals refer to like elements throughout. Also, if detailed descriptions of well-known functions or elements associated with the embodiments are determined to make the embodiments obscure, they are omitted. Also, numbers (e.g., a first, a second, etc.) used in a process of describing the embodiments are merely identification symbols for distinguishing one element from another element.

Hereinafter, an electronic device associated with an embodiment will be described in more detail with reference to the attached drawings. Suffixes "module" and "unit" of elements used herein are added or used mixed with each other in consideration of merely easiness of drawing up of the specification and thus do not have separate meanings or roles.

Examples of an electronic device that will be described herein may include an analog TV, a digital TV, a 3-dimensional (3D) TV, a smart TV, a light emitting diode (LED) TV, an organic LED (OLED) TV, a plasma TV, a monitor, etc. Also, it will be easily understood by those of ordinary skill in the art that the electronic device may be a desktop computer, a portable phone, a smart phone, a tablet PC, a laptop computer, a digital broadcast terminal, a personal digital assistant (PDA), a portable multimedia player (PMP), a navigation system, or the like.

When an element is referred to as being "connected" to another element, it may be "directly connected" or "electrically connected" to another element, and intervening elements may be present. When a part "comprises" an element, this may mean that the part may not exclude and may further include other elements as long as there is no contrary description.

Hereinafter, example embodiments will be described in greater detail with reference to the attached drawings.

FIG. 1 illustrates a system for providing a broadcast program including a particular person, according to an embodiment.

Referring to FIG. 1, the system may include an electronic device 100 and a server 200 that may communicate with each other through a network.

The network may be a telecommunications network. The telecommunications network may include at least one selected from a computer network, Internet, Internet of Things (IoT), and a telephone network.

In the system of FIG. 1, the electronic device 100 may be a TV 100a, a set-top box 100b, or a server 100c but is not limited thereto.

According to an embodiment, it will be easily understood by those of ordinary skill in the art that the electronic device 100 may be realized as an analog TV, a digital TV, a 3D TV, a smart TV, an LED TV, an OLED TV, a plasma TV, a monitor, or the like but is not limited thereto.

The set-top box 100b or an Internet Protocol (IP) set-top box according to an embodiment is a terminal that includes a communicator and a processor and is connected to an external network to provide a multimedia communication service.

According to an embodiment, the system may further include a display apparatus 400 that will be connected to the electronic device 100 through wired and/or wireless communications. According to an embodiment, the electronic device 100 may control the display apparatus 400 to display a broadcast image, etc. on a display unit provided in the display apparatus 400.

The electronic device 100 according to an embodiment may provide a broadcast program from a point in time when a particular person that a user wants to view appears in a TV broadcast program viewing-reserved by the user. For example, the electronic device 100 may record the broadcast program from the point in time when the particular person that the user wants to view appears. The electronic device 100 may also display a thumbnail image of an image, where the particular person appears that the user wants to view, on a display unit 115. Also, the electronic device 100 may automatically change a channel at the point in time when the particular person that the user wants to view appears, to provide the broadcast program so as to enable the user to view the broadcast program.

According to an example embodiment, the user may efficiently and conveniently view a broadcast from a point in time when a person particularly preferred by the user appears in a viewing-reserved broadcast program, not at a point in time when the viewing-reserved broadcast program starts.

According to an embodiment, the user may check a thumbnail image, which is formed by capturing a broadcast image where a preferred particular person appears, and select whether to view the broadcast image where the particular person appears.

The server 200 according to an embodiment may be a server that provides a search service.

The server 200 according to the embodiment may receive a search request, which is based on a search word, from the electronic device 100 and generate a search result by using the search word. For example, the server 200 is an internet portal site and may search and provide contents such as an image, news articles, a moving image, a related site, a web document, a blog, etc. related with the search word.

The server 200 according to the embodiment may receive a search word for searching for an image of a particular person from the electronic device 100 and transmit a search result image, which is based on the search word, to the electronic device 100.

Figure 2:
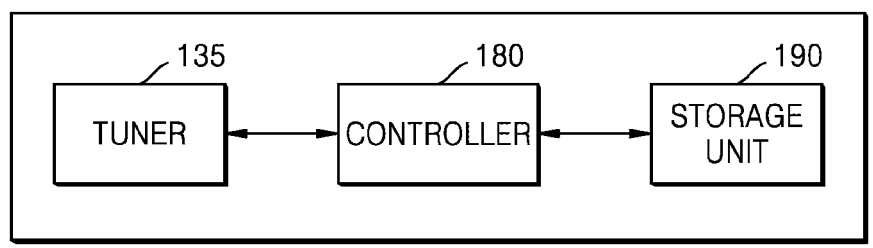
FIGS. 2 and 3 are block diagrams of an electronic device according to an embodiment.
Figure 3:
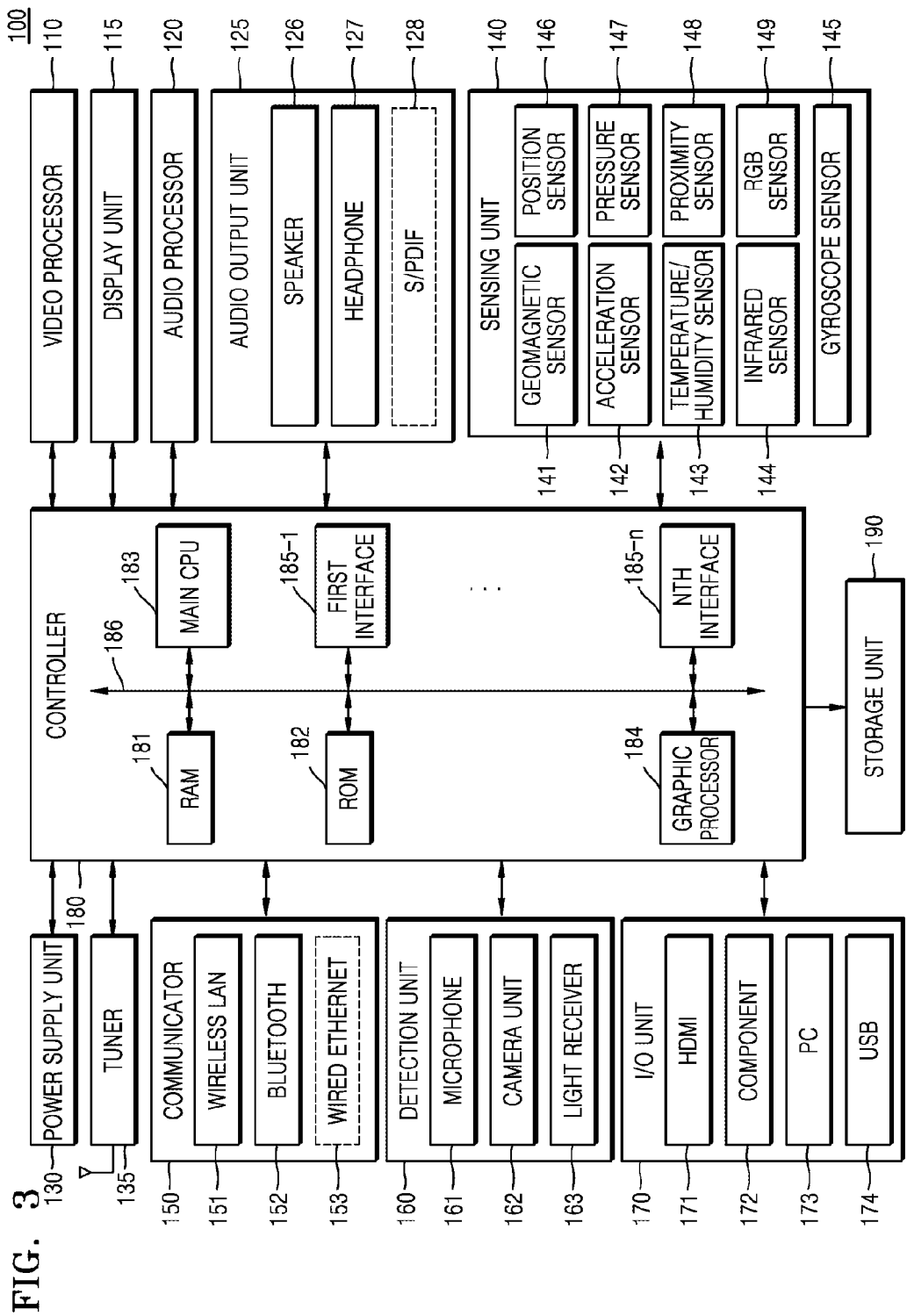

FIGS. 2 and 3 are block diagrams of the electronic device 100, according to an embodiment.

Referring to FIG. 2, the electronic device 100 may include a tuner 135, a storage unit, which may be referred to herein as a storage 190, and a controller 180. However, all of elements illustrated in FIG. 2 are not essential elements. The electronic device 100 may be realized by the larger number of elements than the elements of FIG. 2 or by the smaller number of elements than the elements of FIG. 2. Also, as shown in FIG. 1, the electronic device 100 of FIG. 2 may be realized as the TV 100a, the set-top box 100b, or the server 100c.

For example, as illustrated in FIG. 3, the electronic device 100 according to an embodiment may further include a video processor 110, a display unit comprising a display 115, an audio processor 120, an audio output unit 125, a power supply unit 130, a sensing unit 140, a communicator (e.g., including communication circuitry) 150, a detection unit 160, and an input/output (I/O) unit 170.

Elements mentioned above will now be sequentially described.

The video processor 110 performs processing with respect to video data received by the electronic device 100. The video processor 110 may perform various types of image-processing, such as decoding, scaling, noise filtering, frame rate converting, resolution converting, etc., with respect to the video data.

The display unit 115 displays a video included in a broadcast signal received through the tuner 135 on a screen under control of the controller 180. The display unit 115 may also display a content (e.g., a moving image) input through the communicator 150 or the I/O unit 170. The display unit 115 may output an image stored in the storage unit 190 under control of the controller 180. Also, the display unit 115 may display a voice user interface (UI) (e.g., including a voice command guide) for performing a voice recognition task corresponding to a voice recognition or a motion UI (e.g., including a user motion guide for a motion recognition) for performing a motion recognition task corresponding to a motion recognition.

According to an embodiment, the display unit 115 may display a thumbnail image of a broadcast image including a particular person under control of the controller 180.

The display unit 115 may also display an interface for receiving a user input indicating whether to view the broadcast program, under control of the controller 180.

Also, if a user input to select viewing of the broadcast program is input, the display unit 115 may display a broadcast image of the broadcast program under control of the controller 180.

If it is determined that a person included in the broadcast image is the same as an image of a particular person stored in the storage unit 190, the display unit 115 may automatically change a channel to display the broadcast image under control of the controller 180.

The audio processor 120 performs processing with respect to audio data. The audio processor 120 may perform various types of processing, such as decoding, amplifying, noise filtering, or the like, with respect to the audio data. The audio processor 120 may include a plurality of audio processing modules to process audios corresponding to a plurality of contents.

The audio output unit 125 outputs an audio included in the broadcast signal received through the tuner 135 under control of the controller 180. The audio output unit 125 may output an audio (e.g., a voice, a sound, or the like) input through the communicator 150 or the I/O unit 170. The audio output unit 125 may also output an audio stored in the storage unit 190 under control of the controller 180. The audio output unit 125 may include at least one selected from a speaker 126, a headphone output terminal 127, and a Sony, Phillips Digital Interface (S/PDIF) output terminal 128. The audio output unit 125 may include a combination of the speaker 126, the headphone output terminal 127, and the S/PDIF output terminal 128.

The power supply unit 130 supplies elements 110 through 190 of the electronic device 100 with power input from an external power source under control of the controller 180. The power supply unit 130 may supply the elements 110 through 190 with power output from one battery or two or more batteries (not shown) located in the electronic device 100 under control of the controller 180.

The tuner 135 may amplify, mix, and resonate a broadcast signal, which is received by wired or wireless, to tune and select merely a frequency of a channel that the electronic device 100 wants to receive, from radio wave components. The broadcast signal includes an audio, a video, and additional information (e.g., an electronic program guide (EPG)).

The tuner 135 may receive a broadcast signal in a frequency band corresponding to a channel number (e.g., cable TV No. 506) according to a user input (e.g., a control signal received from a control device, e.g., a channel number input, an up-down input of a channel, or a channel input on an EPG screen).

The tuner 135 may receive a broadcast signal from various types of sources such as terrestrial broadcasting, cable broadcasting, satellite broadcasting, Internet broadcasting, etc. The tuner 135 may receive a broadcast signal from a source such as an analog broadcast, a digital broadcast, or the like. The broadcast signal received through the tuner 135 is decoded (e.g., audio-decoded, video-decoded, or additional information-decoded) to be divided into an audio, a video, and/or additional information. The divided audio, video, and/or additional information may be stored in the storage unit 190 under control of the controller 180.

The tuner 135 of the electronic device 100 may also be one or plural. The tuner 135 may be realized as an all-in-one structure with the electronic device 100 or may be realized as an additional device (e.g., a set-top box (not shown)) having a tuner electrically connected to the electronic device 100 or as a tuner (not shown) connected to the I/O unit 170.

The tuner 135 according to an embodiment may receive a broadcast signal and output the broadcast signal to the display unit 115 under control of the controller 180.

The sensing unit 140 may sense a state of the electronic device 100 or a state around the electronic device 100 and transmit sensed information to the controller 180. The sensing unit 140 may include at least one selected from a magnetic sensor 141, an acceleration sensor 142, a temperature/humidity sensor 143, an infrared sensor 144, a gyroscope sensor 145, a position sensor (e.g., global positioning system (GPS)) 146, a pressure sensor 147, a proximity sensor 148, and an RGB sensor (e.g., an illuminance sensor) 149 but is not limited thereto. Functions of the above-mentioned sensors may be intuitively inferred from their names by those of ordinary skill in the art, and thus their detailed descriptions are omitted.

The sensing unit 140 may include a sensor for sensing a touch input of an input tool and a sensor for sensing a touch input of the user. In this case, the sensor for sensing the touch input of the user may be included in a touch screen or a touch pad. Also, the sensor for sensing the touch input of the input tool may be located under a touch screen or a touch pad or may be included in the touch screen or the touch pad.

The communicator 150 may include various communication circuitry and connect the electronic device 100 to an external device (e.g., an audio device or the like) under control of the controller 180. The controller 180 may transmit and/or receive a content with the external device connected through the communicator 150, download an application to the external device, or perform web-browsing.

The communicator 150 may include at least one selected from a wireless local area network (LAN) 151, Bluetooth 152, and wired Ethernet 153 in response to a performance and a structure of the electronic device 100. The communicator 150 may include a combination of the wireless LAN 151, the Bluetooth 152, and the wired Ethernet 153.

The communicator 150 may also include a Bluetooth Low Energy (BLE) communicator, a Near Field Communication (NFC) unit, an WLAN (Wi-Fi) communicator, a Zigbee communicator, an Infrared Data Association (IrDA) communicator, a Wi-Fi Direct (WFD) communicator, an ultra-wideband (UWB) communicator, an Ant+ communicator, or the like but is not limited thereto.

The communicator 150 may transmit and/or receive a wireless signal with at least one selected from a base station, an external terminal, and a server on a mobile communication network. Here, the wireless signal may include various types of data according to transmission and/or reception of a voice call signal, a video call signal, or letters and/or multimedia messages.

The communicator 150 may also include a broadcast receiver that receives a broadcast signal and/or broadcast-related information from an external source through a broadcast channel. The broadcast channel may include a satellite channel or a terrestrial channel.

Also, the communicator 150 may receive a control signal of an external control device under control of the controller 180. The control signal may be realized as a Bluetooth type, a radio frequency (RF) signal type, or a Wi-Fi type.

The communicator 150 according to an embodiment may communicate with the server 200 under control of the controller 180.

According to an embodiment, the communicator 150 may transmit a search word for searching for an image of a particular person to the server 200 under control of the controller 180.

The communicator 150 may also receive a search result image based on the searched search word from the server 200 under control of the controller 180.

The detection unit 160 detects a voice, an image, or an interaction of the user.

A microphone 161 receives a voice uttered by the user. The microphone 161 may convert the received voice into an electrical signal and output the electrical signal to the controller 180. A user voice may include a voice corresponding to a menu or a function of the electronic device 100. A recognition range of the microphone 161 may be recommended within a range of 4 m from the microphone 161 to a location of the user and vary in response to a volume of the user voice and a surrounding environment (e.g., a speaker sound, surrounding noise, or the like).

The microphone 161 may be realized as an all-in-one type or a separate type with the electronic device 100. The separate type microphone 161 may be electrically connected to the electronic device 100 through the communicator 150 or the I/O unit 170.

It will be easily understood by those of ordinary skill in the art that the microphone 161 may be excluded according to a performance and a structure of the electronic device 100.

A camera unit 162 may include a lens (not shown) and an image sensor (not shown). The camera unit 162 may support an optical zoom or a digital zoom by using a plurality of lenses and image processing. A recognition range of the camera unit 162 may be variously set according to an angle of a camera and a surround environment condition. If the camera unit 162 includes a plurality of cameras, the camera unit 162 may receive a 3D still image or a 3D motion by using the plurality of cameras.

The camera unit 162 may be realized as an all-in-one type or a separate type with the electronic device 100. An additional device (not shown) including the separate type camera unit 162 may be electrically connected to the electronic device 100 through the communicator 150 or the I/O unit 170.

It will be easily understood by those of ordinary skill in the art that the camera unit 162 may be excluded according to a performance and a structure of the electronic device 100.

A light receiver 163 receives a light signal (including a control signal) from an external control device through a light window (not shown) of a bezel of the display unit 115. The light receiver 163 may receive the light signal corresponding to a user input (e.g., a touch, pressing, a touch gesture, a voice, or a motion) from the external control device. The control signal may be extracted from the received light signal under control of the controller 180.

The I/O unit 170 receives a video (e.g., a moving image or the like), an audio (e.g., a voice, music, or the like), and additional information (e.g., an EPG or the like) from an outside of the electronic device 100 under control of the controller 180. The I/O unit 170 may include one selected from a High-Definition Multimedia Interface (HDMI) port 171, a component jack 172, a PC port 173, a universal serial bus (USB) port 174. The I/O unit 170 may include a combination of the HDMI port 171, the component jack 172, the PC port 173, and the USB port 174.

It will be easily understood by those of ordinary skill in the art that a structure and an operation of the I/O unit 170 may be variously realized according to embodiments.

The controller 180 controls an overall operation of the electronic device 100 and a signal flow between the elements 110 through 190 of the electronic device 100, and performs a function of processing data. If there is a user input or a preset and stored condition is satisfied, the controller 180 may execute an operating system (OS) and various types of applications stored in the storage unit 190.

The controller 180 may include a random access memory (RAM) 181 that stores a signal or data input from the outside of the electronic device 100 or is used as a storage area corresponding to various types of jobs performed in the electronic device 100, a read only memory (ROM) 182 that stores a control program for controlling the electronic device 100, and a main central processing unit (CPU) 183.

The main CPU 183 may include a graphic processing unit (GPU) (not shown) for processing a graphic corresponding to a video. The main CPU 183 may be realized as a System On Chip (SoC) into which a core (not shown) and the GPU (not shown) are integrated. The main CPU 183 may include a single core, a dual core, a triple core, a quad core, and a multiple core.

The main CPU 183 may also include a plurality of processors. For example, the main CPU 183 may be realized as a main processor (not shown) and a sub processor (not shown) that operates in a sleep mode.

A graphic processor 184 generates a screen including various types of objects, such as an icon, an image, a text, etc., by using an operator (not shown) and a renderer (not shown). The operator calculates attribute values, such as coordinate values at which the objects will be respectively displayed, shapes, sizes, colors, etc. of the objects, according to a layout of a screen by using the user interaction detected by the detection unit 160. The renderer generates a screen having various types of layouts including objects based on the attribute values calculated by the operator. The screen generated by the renderer is displayed in a display area of the display unit 115.

First through $n^{th}$ interfaces 185-1 through 185-n are connected to various types of elements described above. One of the first through $n^{th}$ interfaces 185-1 through 185-n may be a network interface that is connected to an external device through a network.

The RAM 181, the ROM 182, the main CPU 183, the graphic processor 184, and the first through $n^{th}$ interfaces 185-1 through 185-n may be connected to one another through an internal bus 186.

The term "controller" used herein may include the main CPU 183, the ROM 182, and the RAM 181.

The controller 180 of the electronic device 100 according to an embodiment may acquire a broadcast image including a person from a broadcast signal of a preset broadcast program received through the tuner 135.

The controller 180 may also set information about the broadcast program through a user input.

Also, the controller 180 may receive a search word for searching for an image of the particular person. The controller 180 may transmit the received search word to the server 200 through the communicator 150. The controller 180 may receive a search result image based on the search word from the server 200 through the communicator 150. The controller 180 may store the received search result image in the storage unit 190.

The controller 180 of the electronic device 100 according to an embodiment may determine whether the person included in the broadcast image is the same as an image of a particular person stored in the storage unit 190.

If the person included in the broadcast image is similar to the image of the particular person stored in the storage unit 190 by a preset threshold value or more through a person recognition algorithm, the controller 180 may determine that the person included in the broadcast image is the same as the image of the particular person stored in the storage unit 190.

The controller 180 of the electronic device 100 according to the embodiment may also provide the broadcast program to the user based on a point in time when the particular person is included in the broadcast image.

The controller 180 may record the broadcast image from the point in time when the particular person is included in the broadcast image.

The controller 180 may display a thumbnail image of the broadcast image including the particular person on the display unit 115.

The controller 180 may provide the display unit 115 with an interface for receiving a user input indicating whether to view the broadcast program.

If a user input to select viewing of the broadcast program is received, the controller 180 may provide the display unit 115 with the broadcast image of the broadcast program.

If it is determined that the person included in the broadcast image is the same as the image of the stored particular person, the controller 180 may automatically provide the display unit 115 with the broadcast image of the broadcast program.

It will be easily understood by those of ordinary skill in the art that a structure and an operation of the controller 180 may be variously realized according to embodiments.

The storage unit 190 may store various types of data, programs, or applications for driving and controlling the electronic device 100 under control of the controller 180. The storage unit 190 may store input and/or output signals or data corresponding to driving of the video processor 110, the display unit 115, the audio processor 120, the audio output unit 125, the power supply unit 130, the tuner 140, the communicator 150, the detection unit 160, and the I/O unit 170. The storage unit 190 may store a control program for controlling the electronic device 100 and the controller 180, an application initially provided by a manufacturer or downloaded from an external source, a graphical user interface (GUI) related to the application, an object (e.g., an image text, an icon, a button, or the like) for providing the GUI, user information, a document, databases (DBs), or pieces of related data.

The term "storage unit" or "storage" used in an embodiment may include the storage unit 190, the ROM 182 or the RAM 181 of the controller 180, or a memory card (e.g., a micro secure digital (SD) card, a USB memory, or the like (not shown)) installed in the electronic device 100. The storage unit 190 may include a nonvolatile memory, a volatile memory, a hard disk drive (HDD), or a solid state drive (SSD).

The storage unit 190 according to an embodiment may store an image of a particular person.

The storage unit 190 according to an embodiment may store a search result image, which is received from the server 200 through the communicator 150 and is based on a search word for searching for an image of a particular person, under control of the controller 180.

The storage unit 190 may include a broadcast reception module, a channel control module a volume control module, a communication control module, a voice recognition module, a motion recognition module, a light reception module, a display control module, an audio control module, an external input control module, a power control module, a power control module of an external device connected by wireless (e.g., Bluetooth), a voice DB, or a motion DB that is not shown. Modules and DBs of the storage unit 190 that are not shown may be embodied as software types to perform a control function of a broadcast reception, a channel control function, a volume control function, a communication control function, a voice recognition function, a motion recognition function, a light reception control function, a display control function, an audio control function, an external input control function, a power control function, or a power control function of an external device connected by wireless (e.g., Bluetooth) in the electronic device 100. The controller 180 may perform functions by using pieces of software stored in the storage unit 190.

Also, the electronic device 100 having the display unit 115 may be electrically connected to an additional external device (e.g., a set-top box (not shown)) having a tuner. For example, it will be easily understood by those of ordinary skill in the art that the electronic device 100 may be realized as an analog TV, a digital TV, a 3D TV, a smart TV, an LED TV, an OLED TV, a plasma TV, a monitor, or the like but is not limited thereto.

At least one selected from the elements 110 through 190 of the electronic device 100 of FIG. 3 may be added or deleted according to a performance of the electronic device 100. Also, it will be easily understood by those of ordinary skill in the art that locations of elements (e.g., 110 through 190) may be changed according to a performance or a structure of the electronic device 100.

Figure 4:
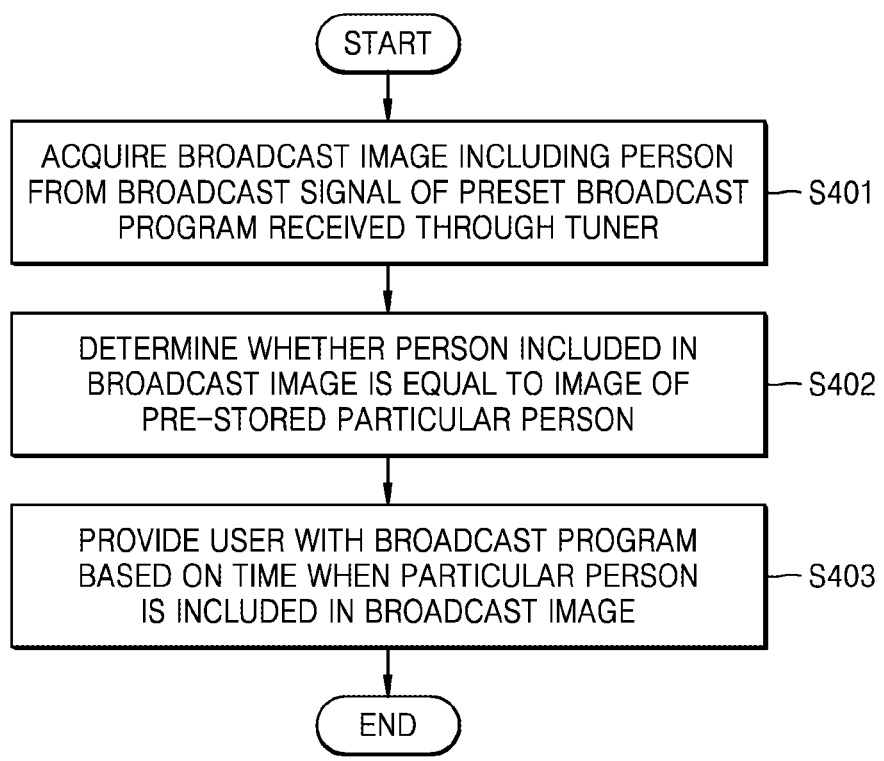
FIG. 4 is a flowchart of a method of providing a broadcast program including a particular person through an electronic device, according to an embodiment.

FIG. 4 is a flowchart of a method of providing a broadcast program including a particular person, according to an embodiment.

Referring to FIG. 4, in operation S401, the controller 180 of the electronic device 100 may acquire a broadcast image including a person from a broadcast signal of a preset broadcast program received through the tuner 135.

According to an embodiment, the electronic device 100 may receive information about the broadcast program from a user. For example, the user may designate a program name of a particular TV broadcast program that the user wants to view, so as to set the particular TV broadcast program to be viewing-reserved.

Also, the controller 180 of the electronic device 100 according to an embodiment may extract an image including at least one-person image from the broadcast signal of the viewing-reserved TV broadcast program received through the tuner 135, through a person recognition algorithm.

In operation S402 of FIG. 4, the controller 180 of the electronic device 100 may determine whether the person included in the broadcast image is the same as an image of a pre-stored particular person.

According to an embodiment, the electronic device 100 may compare whether the person image included in the broadcast image is the same as the image of the particular person pre-stored in the storage unit 190 to determine a point in time when a particular person that the user wants to view appears.

According to an embodiment, if the person included in the broadcast image is similar to the image of the particular person stored in the storage unit 190 by a preset threshold value or more through a person recognition algorithm, the controller 180 may determine that the person included in the broadcast image is the same as the image of the particular person.

The person recognition algorithm may be an algorithm that compares and analyzes a plurality of person images to determine similarities and, if the plurality of person images are similar to one another by a preset threshold value or more, determines the plurality of person images as the same person.

The controller 180 of the electronic device 100 according to an embodiment may communicate with the server 200 to store an image of a particular person in the storage unit 190.

According to an embodiment, the controller 180 of the electronic device 100 may receive a search word for searching for an image of a particular person through a user input. The controller 180 of the electronic device 100 may transmit the search word to the server 200 through the communicator 150. The controller 180 may also receive a search result image based on the search word from the server 200 through the communicator 150 and store the search result image in the storage unit 190.

In operation S403 of FIG. 4, the controller 180 of the electronic device 100 according to an embodiment may provide the user with the broadcast program based on a point in time when the particular person is included in the broadcast image.

According to an embodiment, the controller 180 of the electronic device 100 may record the broadcast image from the point in time when the particular person is included in the broadcast image.

The controller 180 may also display a thumbnail image of the broadcast image including the particular person on the display unit 115.

The controller 180 may provide the display unit 115 with an interface for receiving a user input indicating whether to view the broadcast program. If a user input to select viewing of the broadcast program, the controller 180 may provide the display unit 115 with the broadcast image of the broadcast program.

If it is determined that the person included in the broadcast image is the same as the image of the particular person stored in the storage unit 190, the controller 180 may automatically provide the display unit 115 with the broadcast image of the broadcast program.

Figure 5:
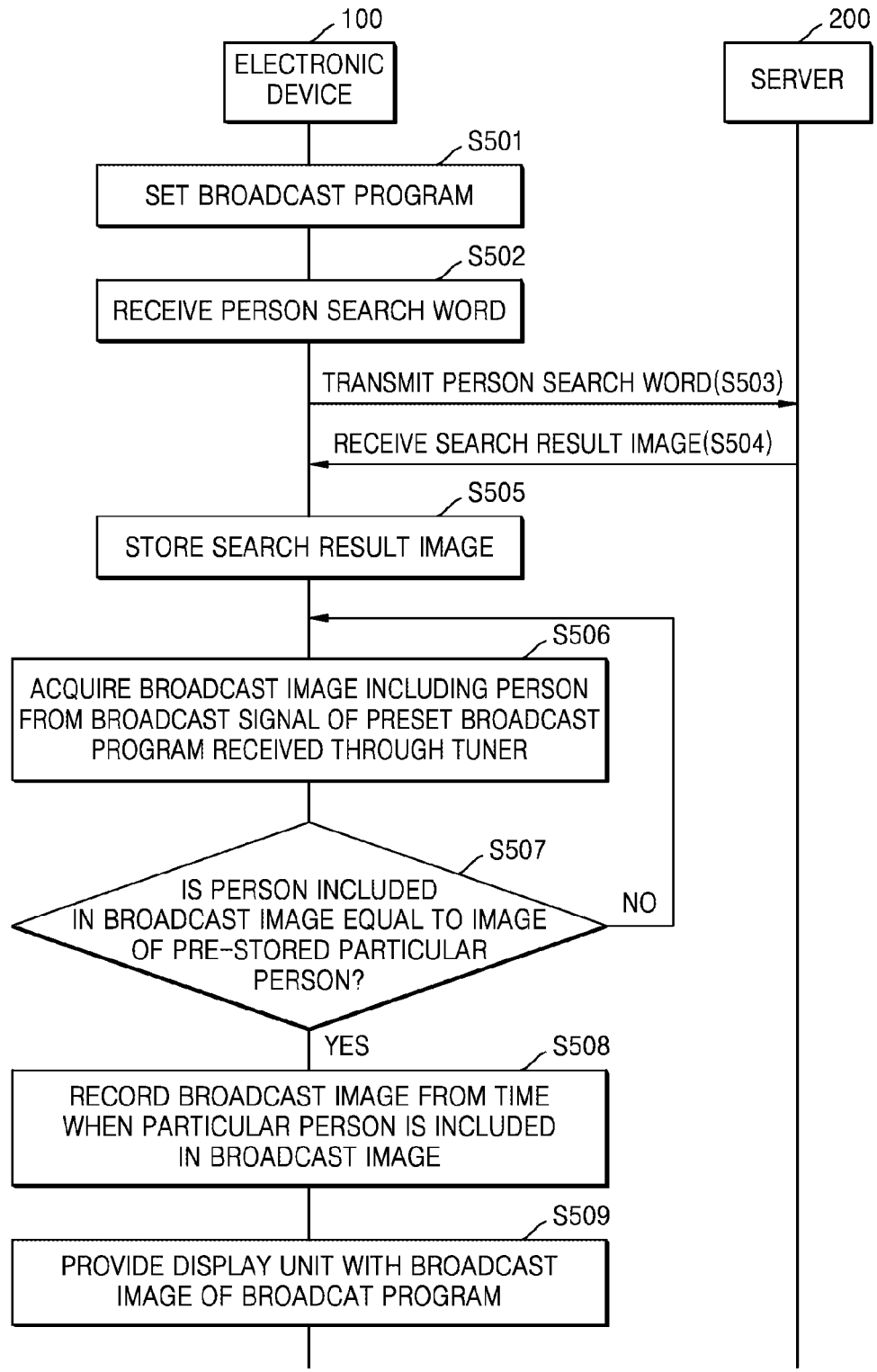
FIG. 5 is a flowchart of a method of controlling an electronic device and a server, according to an embodiment.

FIG. 5 is a flowchart of a method of controlling an electronic device and a server, according to an embodiment.

In operation S501 of FIG. 5, the controller 180 of the electronic device 100 according to an embodiment may set a broadcast program. For example, the controller 180 may receive a particular program name from a user and set viewing reservation.

In operation S502 of FIG. 5, the controller 180 of the electronic device 100 according to an embodiment may receive a person search word. For example, the controller 180 of the electronic device 100 may receive a search word for searching an external search server for an image of a person such as a real name of a person that the user wants to view, a character name of the person, a nickname of the person, or the like.

In operation S503 of FIG. 5, the controller 180 of the electronic device 100 according to an embodiment may transmit the person search word to the server. According to an embodiment, the controller 180 may transmit a search word input through a user input and a signal for requesting to search for an image based on the search word to the server 200 through the communicator 150.

In operation S504 of FIG. 5, the controller 180 of the electronic device 100 according to an embodiment may receive a search result image from the server 200.

According to an embodiment, the server 200 may generate a search result by using a search word. For example, the server 200 is an Internet portal site, and may search for and provide a content such as an image, news articles, a moving image, a related site, a web document, a blog, or the like related to a search word.

According to an embodiment, the electronic device 100 may receive at least one-person image searched based on a person search word from the server 200.

In operation S505 of FIG. 5, the controller 180 of the electronic device 100 according to an embodiment may store the search result image received in operation S504 in the storage unit 190.

In the S506 of FIG. 5, the controller 180 of the electronic device 100 according to an embodiment may acquire a broadcast image including a person from a broadcast signal of the preset broadcast program received through the tuner 135.

According to an embodiment, if the broadcast signal of the broadcast program set in operation S501 is received, the controller 180 may extract an image including a person from the broadcast signal.

In operation S507 of FIG. 5, the controller 180 of the electronic device 100 according to an embodiment may determine whether the person included in the broadcast image is the same as an image of a pre-stored particular person. Operation S507 is the same as operation S402 of FIG. 4 described above, and thus a detailed description thereof is omitted.

If it is determined in operation S507 that the person included in the broadcast image is the same as the image of the particular person stored in the storage unit 190, the controller 180 of the electronic device 100 according to an embodiment may record the broadcast image from a point in time when the particular person is included in the broadcast image.

For example, if a broadcast program of another channel viewing-reserved by the user starts and a particular person set by the user appears when the user is viewing a TV broadcast, the electronic device 100 may record a broadcast program viewing-reserved by the user from a point in time when the particular person appears.

In operation S509 of FIG. 5, the controller 180 of the electronic device 100 according to an embodiment may provide the display unit 115 with the broadcast image of the broadcast program.

According to an embodiment, if it is determined that the person included in the broadcast image is the same as the image of the particular person stored in the storage unit 190, the controller 180 may automatically provide the display unit 115 with the broadcast image of the broadcast program. For example, the electronic device 100 may automatically change a TV broadcast channel.

Also, according to an embodiment, the controller 180 may provide the display unit 115 with a screen indicating that a particular person set by the user appears in a broadcast program viewing-reserved by the user.

According to an embodiment, the controller 180 may provide the display unit 115 with an interface for receiving a user input indicating whether to immediately view a broadcast program viewing-reserved by the user. According to an embodiment, if a user input to select viewing of a broadcast program is received, the controller 180 may change a TV broadcast channel to display a broadcast image of a broadcast program viewing-reserved by the user on the display unit 115.

Figure 6:
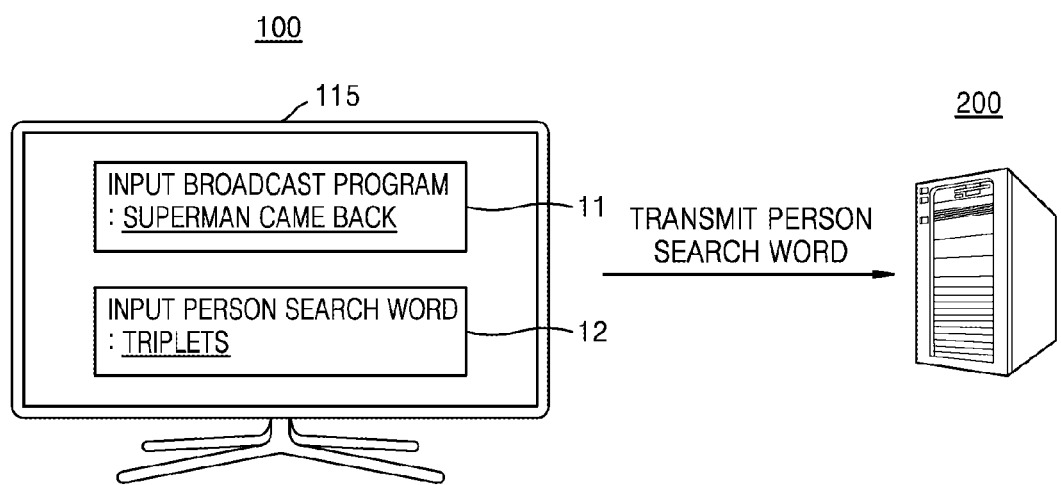
FIG. 6 illustrates broadcast program setting and inputting of a person search word, according to an embodiment.

FIG. 6 illustrates broadcast program setting and person search word inputting, according to an embodiment.

As illustrated in FIG. 6, the electronic device 100 may receive a broadcast program name 11 (e.g., "Superman came back.") that a user wants to reserve and view.

The electronic device 100 may also receive information about an appearing person that the user wants to view in a program that is reserved and viewed by the user, e.g., information 12 (e.g., "triplets") about a real name, a character name, a nickname, etc. of the person.

According to an embodiment, the controller 180 of the electronic device 100 may transmit information about an appearing person that the user wants to view, to the server 200 (e.g., a search engine server) through the communicator 150.

FIG. 6 illustrates an embodiment but is not limited thereto.

Figure 7:
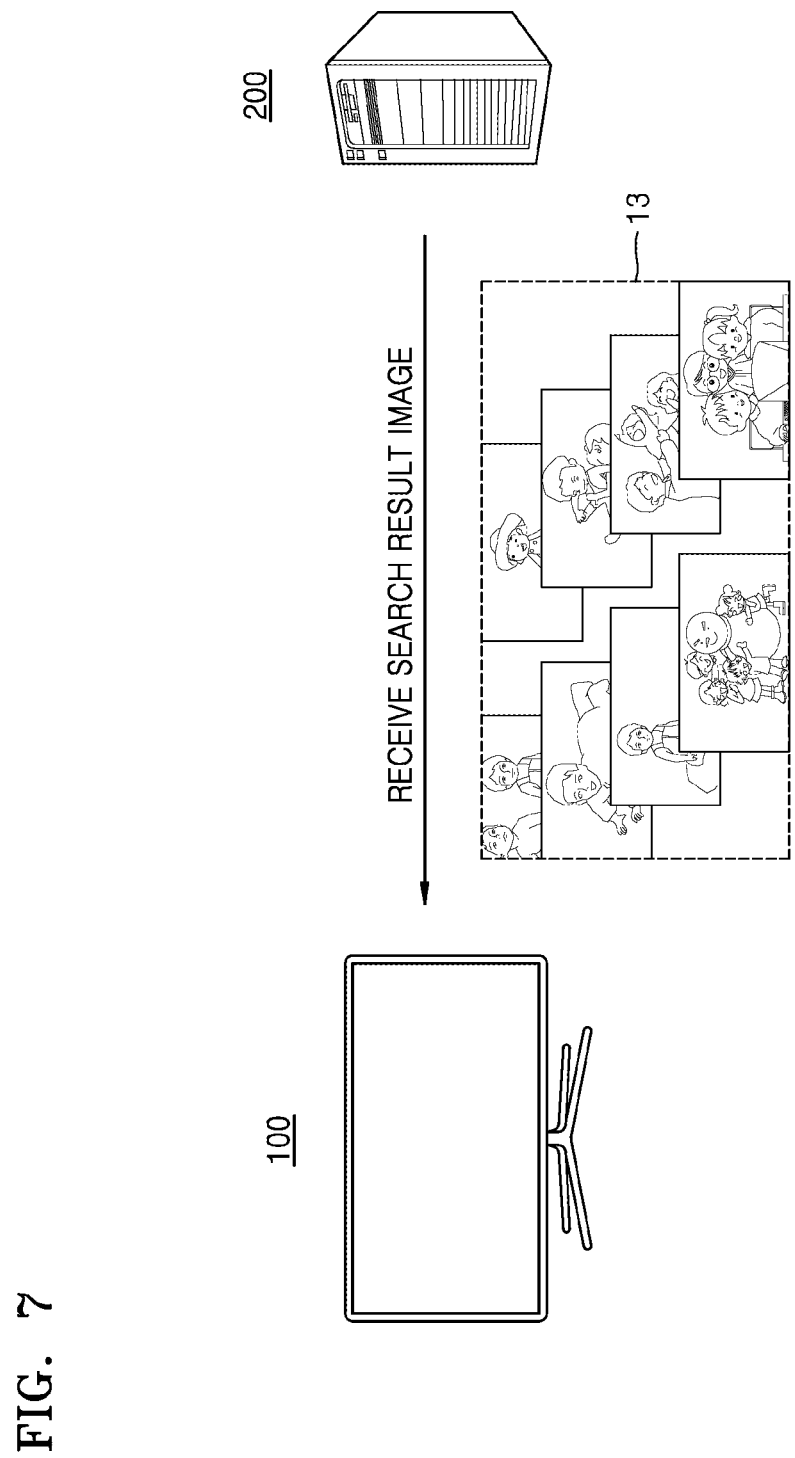
FIG. 7 illustrates person image searching according to an embodiment.

FIG. 7 illustrates a person image search according to an embodiment.

According to an embodiment, the server 200 may generate a search result image based on a person search word received from the electronic device 100.

According to an embodiment, the electronic device 100 may receive the search result image from the server 200 through the communicator 150.

For example, the search result image may be at least one image searched from a search engine of an Internet portal site based on a person search word (e.g., "triplets" shown in FIG. 6)

Also, according to an embodiment, the electronic device 100 may store the search result image received from the server 200 in the storage unit 190.

According to an embodiment, the electronic device 100 may compare an image of a particular person stored in the storage unit 190 and a person image extracted from a broadcast signal of a broadcast program viewing-reserved by the user to determine whether the person image is the same as the image of the particular person.

FIG. 7 illustrates an embodiment but is not limited thereto.

Figure 8:
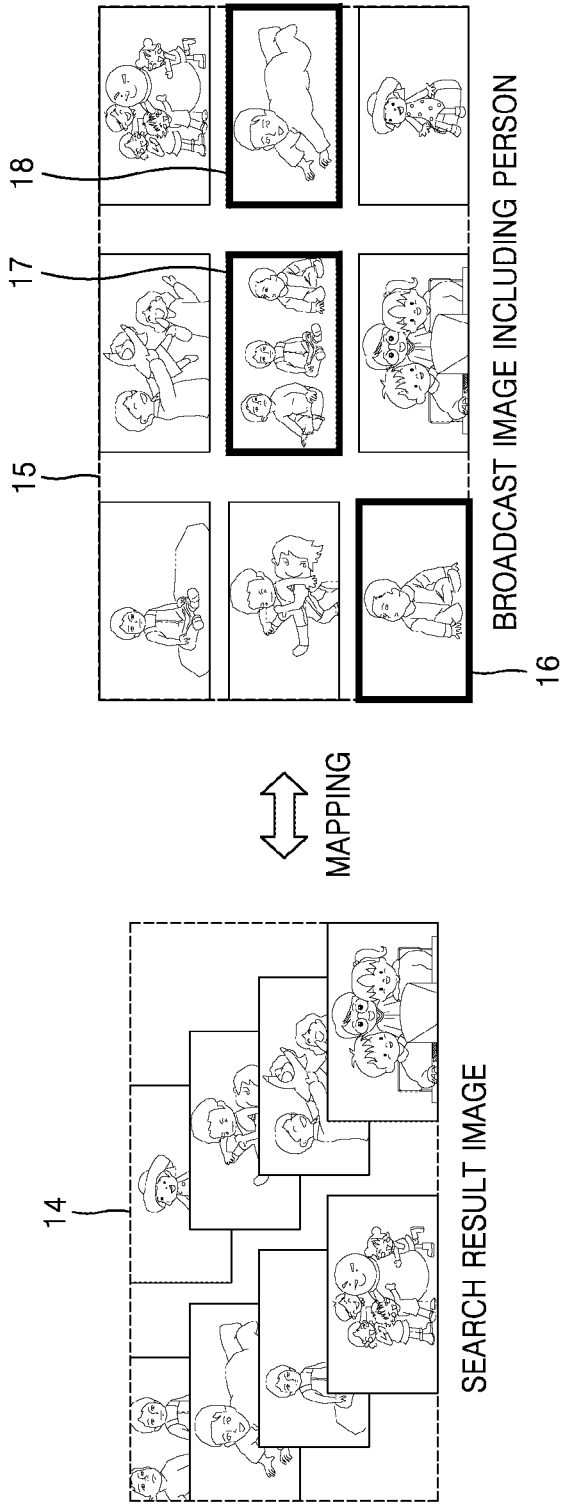
FIG. 8 illustrates person image mapping according to an embodiment.

FIG. 8 illustrates person image mapping according to an embodiment.

The electronic device 100 according to an embodiment may map whether the person included in the broadcast image acquired in operation S401 of FIG. 4 is the same as an image of a particular person pre-stored in the storage unit 190.

According to an embodiment, if the person image extracted from the broadcast signal of the broadcast program viewing-reserved by the user is similar to the image of the particular person pre-stored in the storage unit 190 by a preset threshold value through a person recognition algorithm, the controller 180 may determine that the extracted person image is the same as the image of the particular person.

As illustrated in FIG. 8, for example, the electronic device 100 may compare a search result image 14 with images 15 including a person in a broadcast image of a broadcast program viewing-reserved by the user.

For example, the electronic device 100 may compare the search result image 14 received from an external search engine with the images 15 including the person in "Superman came back." viewing-reserved by the user by using "triplets" as a search word.

According to an embodiment, the electronic device 100 may determine broadcast images 16, 17, and 18 including the same person as the search result image 14 to determine a point in time when a particular person set by the user appears, by using a person recognition algorithm.

FIG. 8 illustrates an embodiment but is not limited thereto.

Figure 9:
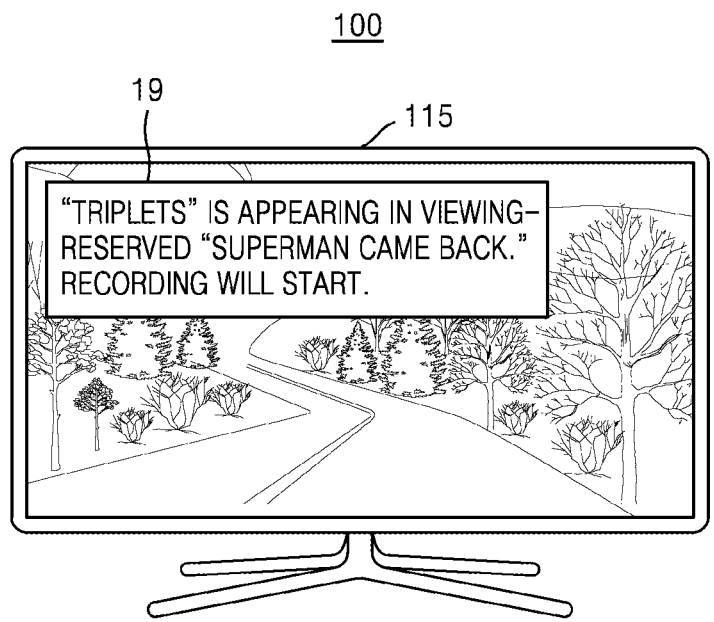
FIG. 9 illustrates recording of a broadcast image including a particular person, according to an embodiment.

FIG. 9 illustrates recording of a broadcast image including a particular person, according to an embodiment.

As illustrated in FIG. 9, for example, the electronic device 100 may display an interface 19 on the display unit 115, wherein the interface 19 is for notifying the user that "triplets" set by the user appear in a broadcast image of "Superman came back," previously viewing-reserved by the user when the user is viewing a TV broadcast.

The electronic device 100 may also record a broadcast program of "Superman came back." from a point in time when the "triplets" viewing-reserved by the user appear. Referring to FIG. 9, for example, the electronic device 100 may display the interface 19 notifying starting of recording on the display unit 115.

FIG. 9 illustrates a notification screen that overlaps with a broadcast image that the user is viewing to be displayed in a pop-up window form but is not limited thereto.

Figure 10A:
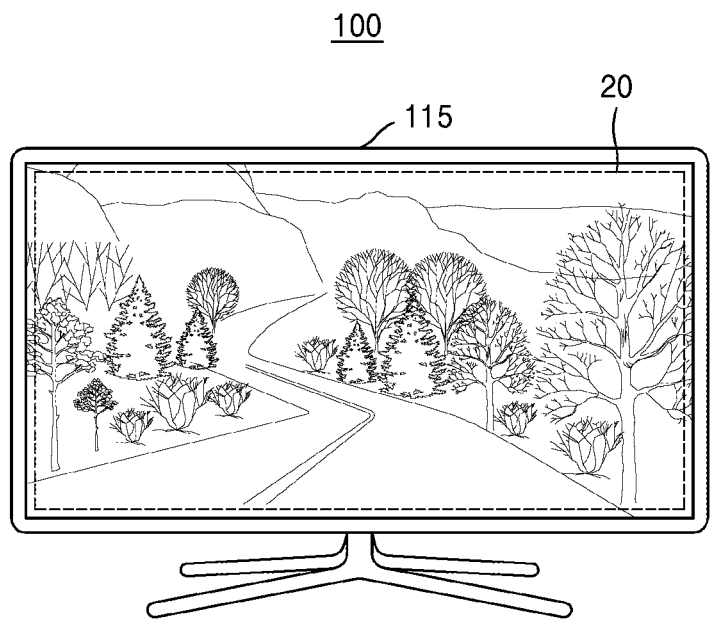
FIGS. 10A and 10B illustrate displaying of a broadcast image including a particular person, according to an embodiment.
Figure 10B:
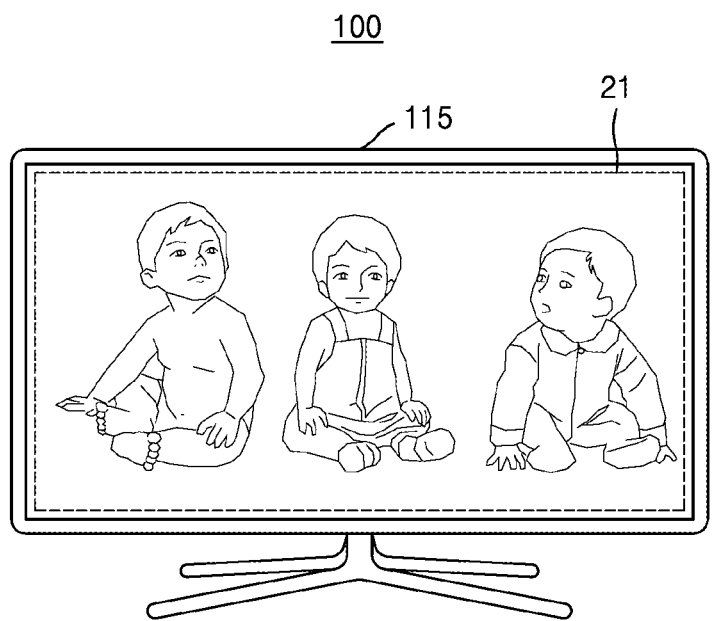

FIGS. 10A and 10B illustrate displaying of a broadcast image including a particular person, according to an embodiment.

If it is determined that a person included in a broadcast image is the same as an image of a particular person stored in the storage unit 190, the controller 180 of the electronic device 100 according to an embodiment may automatically provide the display unit 115 with the broadcast image of a broadcast program.

As illustrated in FIGS. 10A and 10B, for example, if an appearing time of "triplets" of a viewing-reserved broadcast program (e.g., "Superman came back.") arrives when providing an image 20 of another channel to the display unit 115 as shown in FIG. 10A, the electronic device 100 may automatically change a channel to display a broadcast image 21 of "Superman came back." on the display unit 115 as shown in FIG. 10B.

According to an embodiment, the user may conveniently and efficiently view a broadcast program from a point in time when a particular person preferred by the user appears.

FIGS. 10A and 10B illustrate an embodiment but are not limited thereto.

Figure 11:
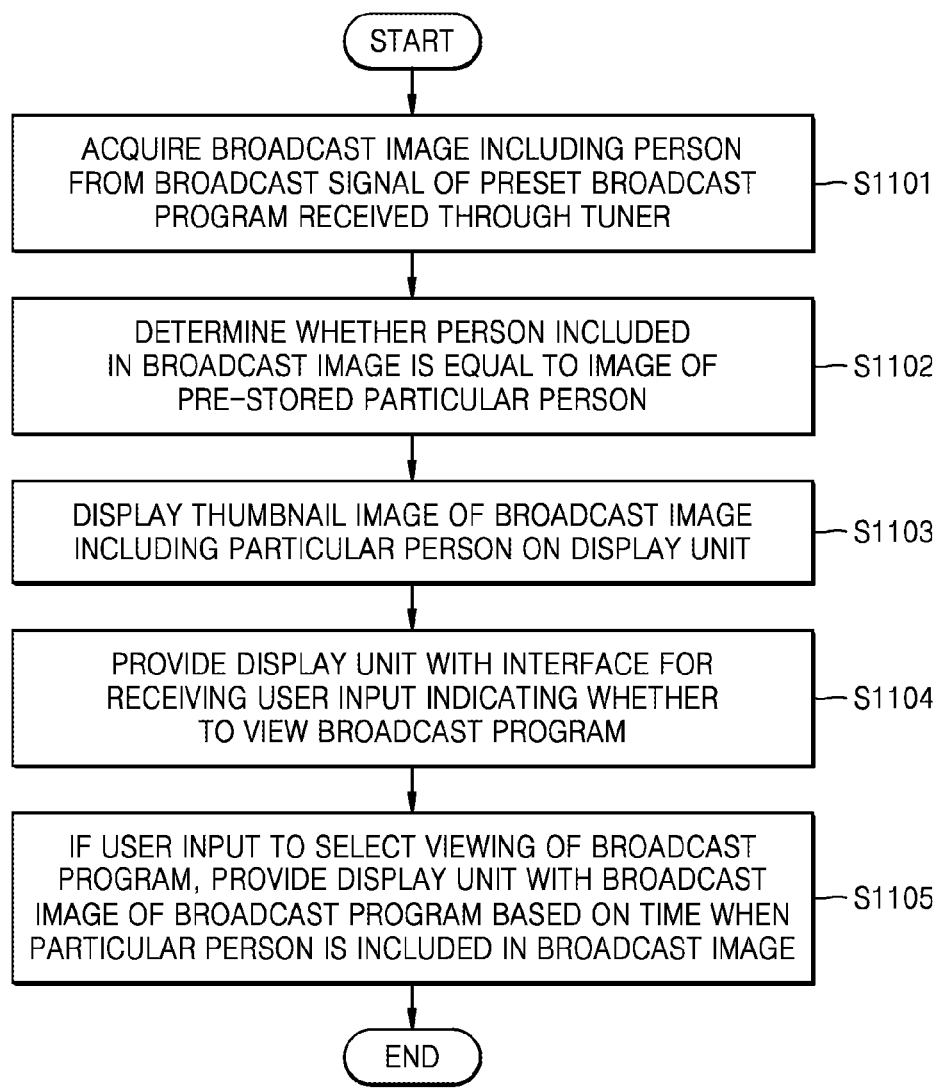
FIG. 11 is a flowchart of a method of providing a user with a broadcast program, according to an embodiment.

FIG. 11 is a flowchart of a method of providing a broadcast program to a user, according to an embodiment.

In operation S1101 of FIG. 11, the controller 180 of the electronic device 100 according to an embodiment may acquire a broadcast image including a person from a broadcast signal of a preset broadcast program received through the tuner 135. In operation S1102, the controller 180 of the electronic device 100 may determine whether the person included in the broadcast image is the same as an image of a pre-stored particular person. Descriptions of operations S1101 and S1102 are the same as those of operations S401 and 402 of FIG. 2, and thus their detailed descriptions are omitted.

In operation S1103 of FIG. 11, the controller 180 of the electronic device 100 may display a thumbnail image of the broadcast image including the particular person on the display unit 115.

For example, the electronic device 100 may capture a screen on which a person of a broadcast program viewing-reserved by a user appears, to display the captured screen in a thumbnail image form on the display unit 115. Therefore, the user may pre-check an image of a reserved program that is being broadcast.

A thumbnail image may refer to a captured image that is made small to be represented as an image having a small size.

In operation S1104 of FIG. 11, the controller 180 of the electronic device 100 may provide the display unit 115 with an interface for receiving a user input indicating whether to view the broadcast program. For example, the controller 180 may display an interface screen on the display unit 115, wherein the interface screen is for selecting a channel so as to enable the channel to be changed into a broadcast program reserved by the user.

If a user input to select viewing of the broadcast program is received, the controller 180 of the electronic device 100 may provide the display unit 115 with a broadcast image of the broadcast program based on a point in time when a particular person is included in the broadcast image in operation S1105.

According to an embodiment, the controller 180 may record a viewing-reserved broadcast program from a point in time when a person preset by the user appears. The controller 180 of the electronic device 100 may play a recorded image so as to enable the user to view an image of a broadcast program, where a particular person appears, without missing the image.

Figure 12:
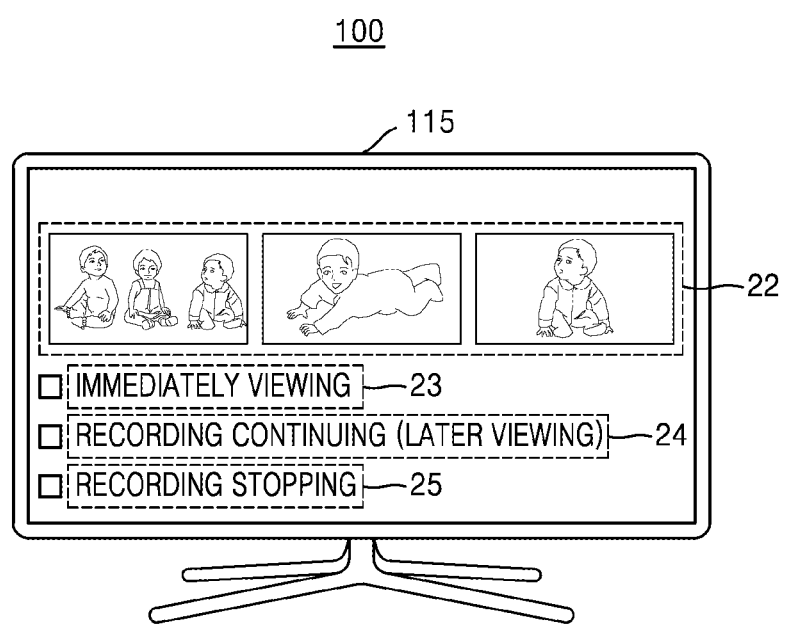
FIG. 12 illustrates providing of a broadcast program to a user, according to an embodiment.

FIG. 12 illustrates providing of a broadcast program to a user, according to an embodiment.

As shown in FIG. 12, the controller 180 of the electronic device 100 may display a thumbnail image 22 of a broadcast image including a particular person on the display unit 115.

A thumbnail image of a broadcast image including a particular person refers to an image that is formed by capturing an image including a particular person set by a user among a broadcast program viewing-reserved by the user and displaying the captured image in a thumbnail form.

According to an embodiment, before changing a channel, the user may check that a particular person set by the user appears in a viewing-reserved broadcast program, through the thumbnail image 22. The user may check a thumbnail image that is formed by capturing a broadcast program and then select whether to change a channel.

Also, as shown in FIG. 12, the controller 180 of the electronic device 100 may display an interface for receiving a user input indicating whether to view broadcast program on the display unit 115.

For example, the electronic device 100 may provide the display unit 115 with a menu 23 (e.g., "immediately viewing") for changing a channel into a broadcast program viewing-reserved by the user to immediately view the broadcast program.

Also, for example, the electronic device may provide the display unit 115 with a menu 24 (e.g., "recording continuing" (later viewing)) for continuously performing recording of the broadcast program viewing-reserved by the user and for continuously viewing another broadcast program that the user is currently viewing.

Also, for example, the electronic device 100 may provide the display unit 115 with a menu 25 (e.g., "recording stopping") for stopping recording of the broadcast program viewing-reserved by the user.

FIG. 12 illustrates an embodiment but is not limited thereto.

It may be understood that the above-described embodiments are examples but are not limited. Also, it may be understood that orders of operations illustrated in the flowcharts of FIGS. 4, 5, and 11 are not limited, but some of the operations may be omitted or added, and orders of some operations may be changed.

Some embodiments may be realized as a recording medium type including a computer-executable command such as a computer-executable program module. A computer readable recording medium may be an arbitrary available medium that may be accessed by a computer, and examples of the computer readable recording medium include all of volatile and nonvolatile media, and separable and inseparable media. The computer readable recording medium may also include all of a computer storage medium and a communication medium. Examples of the computer storage medium include all of volatile and nonvolatile media, and separable and inseparable media that are embodied according to an arbitrary method or technology for storing information such as a command, a data structure, a program module, or other pieces of data that may be read by a computer. The communication medium includes a computer readable command, a data structure, a program module, other pieces of data of a modulated data signal such as carrier waves, or other transmission mechanisms and includes an arbitrary information transmission medium.

Also, the term "unit" used herein may be a hardware component such as a processor or a circuit and/or a software component executed by a hardware component such as a processor.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electronic device comprising:
   a tuner configured to receive a broadcast signal;
   a storage configured to store an image of a particular person; and
   a controller configured to at least:
      acquire a broadcast image comprising a person from a broadcast signal of a broadcast program currently received through the tuner;
      determine whether the person in the broadcast image of the currently received broadcast program corresponds to the particular person in the stored image by comparing the broadcast image and the stored image; and
      based on determining that the person in the broadcast image of the currently received broadcast program corresponds to the particular person in the stored image, control display of an interface comprising a thumbnail of the person in the broadcast image and, based on receiving a selection input while the interface is displayed, provide the currently received broadcast program.

2. The electronic device of claim 1, further comprising: communication circuitry,
   wherein the controller is further configured to receive a search word for searching for the image of the particular person, to transmit the received search word to an external server via the communication circuitry, to receive a search result image based on the search word from the external server, and to store the search result image in the storage as the stored image.

3. The electronic device of claim 1, wherein the controller is further configured to, based on a person recognition algorithm determining that the person in the broadcast image has a similarity to the particular person in the stored image which is greater than or equal to a preset threshold similarity value, determine that the person in the broadcast image corresponds to the particular person in the stored image.

4. The electronic device of claim 1, wherein the controller is further configured to, based on receiving the input, record the currently received broadcast program.

5. The electronic device of claim 1, further comprising: a display.

6. The electronic device of claim 1, wherein the controller is further configured to, based on receiving the input, control display of the currently received broadcast program.

7. A method of providing a broadcast program, the method comprising:
   acquiring a broadcast image comprising a person from a broadcast signal of a broadcast program currently received through a tuner;
   determining whether the person in the broadcast image corresponds to a particular person in a pre-stored image by comparing the broadcast image and the stored image; and
   based on determining that the person in the broadcast image of the currently received broadcast program corresponds to the particular person in the stored image, control display of an interface comprising a thumbnail of the person in the broadcast image and, based on receiving a selection input while the interface is displayed, providing the currently received broadcast program.

8. The method of claim 7, further comprising:
   receiving a search word for searching for the image of the particular person;
   transmitting the received search word to an external server via communication circuitry;
   receiving a search result image based on the search word from the external server through the communication circuitry; and
   storing the search result image as the stored image.

9. The method of claim 7, wherein, based on a person recognition algorithm determining that the person in the broadcast image has a similarity to the particular person in the stored image which is greater than or equal to a preset threshold similarity value, determining that the person in the broadcast image corresponds to the particular person in the pre-stored image.

10. The method of claim 7, wherein the providing of the broadcast program comprises, based on receiving the input, recording the currently received broadcast program.

11. The method of claim 7, wherein the providing of the broadcast program comprises, based on receiving the input, displaying the currently received broadcast program.

12. A non-transitory computer-readable recording medium having recorded thereon a program which, when executed by a processor of an electronic device, controls the electronic device to perform at least:
   acquiring a broadcast image comprising a person from a broadcast signal of a broadcast program currently received through a tuner;
   determining whether the person in the broadcast image corresponds to a particular person in a pre-stored image by comparing the broadcast image and the stored image; and based on determining that the person in the broadcast image of the currently received broadcast program corresponds to the particular person in the stored image, control display of an interface comprising a thumbnail of the person in the broadcast image and, based on receiving a selection input while the interface is displayed, providing the currently received broadcast program.

* * * * *